(12) United States Patent
Stavrou et al.

(10) Patent No.: US 9,531,747 B2
(45) Date of Patent: *Dec. 27, 2016

(54) MALWARE DETECTOR

(71) Applicant: George Mason Research Foundation, Inc., Fairfax, VA (US)

(72) Inventors: Angelos Stavrou, Springfield, VA (US);
Sushil Jajodia, Oakton, VA (US);
Anup K. Ghosh, Centreville, VA (US);
Rhandi Martin, St. James (BB);
Charalampos Andrianakis, Crete (GR)

(73) Assignee: George Mason Research Foundation, Inc., Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/482,793

(22) Filed: Sep. 10, 2014

(65) Prior Publication Data

US 2015/0264059 A1    Sep. 17, 2015

Related U.S. Application Data

(63) Continuation of application No. 12/757,675, filed on Apr. 9, 2010, now Pat. No. 8,935,773.

(Continued)

(51) Int. Cl.
*G06F 11/00* (2006.01)
*H04L 29/06* (2006.01)
(Continued)

(52) U.S. Cl.
CPC ........... *H04L 63/145* (2013.01); *G06F 21/566* (2013.01); *H04L 63/0884* (2013.01);
(Continued)

(58) Field of Classification Search
CPC ...................................................... G06F 21/56
(Continued)

(56) References Cited

U.S. PATENT DOCUMENTS 7,693,991 B2    4/2010    Greenlee et al.
7,840,801 B2    11/2010    Berger et al.
(Continued)

OTHER PUBLICATIONS

Office Action for U.S. Appl. No. 12/558,841, mailed Apr. 3, 2012.
(Continued)

*Primary Examiner* — Christopher Brown

(57) ABSTRACT

A transparent proxy for malware detection includes a monitor module, a protocol determination module, a challenge generation module, a response determination module, and a data control module. The monitor module examines data originating from an application towards a remote server. The protocol determination module identifies the protocol type used for the data. The challenge generation module produces a challenge for the application based upon the protocol type, sends the challenge to the application, and maintains a state related to the data and the challenge. The response determination module makes a determination if an automatic non-interactive application response is received in response to the challenge from the application. The data control module allows the first data to continue to the remote server when the determination is valid. The data control module reports malware detection and blocks the data to continue to the remote server when the determination is invalid.

22 Claims, 10 Drawing Sheets

Related U.S. Application Data

(60) Provisional application No. 61/168,053, filed on Apr. 9, 2009.

(51) Int. Cl.
*G06F 21/56* (2013.01)
*H04L 29/08* (2006.01)

(52) U.S. Cl.
CPC .. *H04L 63/1416* (2013.01); *G06F 2221/2103* (2013.01); *G06F 2221/2119* (2013.01); *H04L 63/08* (2013.01); *H04L 67/02* (2013.01)

(58) Field of Classification Search
USPC .......................................... 726/24; 713/188
See application file for complete search history.

(56) References Cited

U.S. PATENT DOCUMENTS

| | | | |
|---|---|---|---|
| 7,899,867 B1 | 3/2011 | Sherstinsky et al. | |
| 8,935,773 B2 | 1/2015 | Stavrou et al. | |
| 2004/0008652 A1 | 1/2004 | Tanzella et al. | |
| 2004/0025158 A1 | 2/2004 | Traut | |
| 2004/0064735 A1 | 4/2004 | Frazier et al. | |
| 2004/0093372 A1 | 5/2004 | Chen et al. | |
| 2005/0097199 A1* | 5/2005 | Woodard | H04L 67/125 709/223 |
| 2006/0168171 A1* | 7/2006 | Childress | G06Q 10/06 709/223 |
| 2006/0271661 A1 | 11/2006 | Qi et al. | |
| 2007/0044151 A1 | 2/2007 | Whitmore | |
| 2007/0079307 A1 | 4/2007 | Dhawan et al. | |
| 2007/0271610 A1 | 11/2007 | Grobman | |
| 2008/0059556 A1 | 3/2008 | Greenspan et al. | |
| 2008/0082976 A1 | 4/2008 | Steinwagner et al. | |
| 2008/0141266 A1 | 6/2008 | Hunt et al. | |
| 2009/0044265 A1 | 2/2009 | Ghosh et al. | |
| 2009/0125902 A1 | 5/2009 | Ghosh et al. | |
| 2009/0126019 A1* | 5/2009 | Memon | H04L 63/1416 726/23 |
| 2009/0300739 A1 | 12/2009 | Nice et al. | |
| 2010/0064039 A9 | 3/2010 | Ginter et al. | |
| 2010/0122342 A1 | 5/2010 | El-Moussa et al. | |
| 2010/0122343 A1 | 5/2010 | Ghosh et al. | |
| 2010/0125903 A1 | 5/2010 | Devarajan et al. | |
| 2010/0223613 A1 | 9/2010 | Schneider | |
| 2011/0099620 A1 | 4/2011 | Stavrou et al. | |
| 2011/0265169 A1* | 10/2011 | Bauer-Hermann | G06F 17/30867 726/7 |
| 2012/0297457 A1 | 11/2012 | Schulte et al. | |

OTHER PUBLICATIONS

Office Action for U.S. Appl. No. 12/558,841, mailed Jan. 30, 2013.
Final Office Action for U.S. Appl. No. 12/037,412, mailed Apr. 23, 2012.
Office Action for U.S. Appl. No. 12/037,412, mailed Oct. 27, 2011.
Office Action for U.S. Appl. No. 12/059,454, mailed Feb. 2, 2011.
Final Office Action for U.S. Appl. No. 12/059,454, mailed Oct. 12, 2011.
Office Action for U.S. Appl. No. 12/757,675, mailed May 15, 2013, 20 pages.
Office Action for U.S. Appl. No. 12/757,675, mailed Aug. 2, 2012, 21 pages.
Office Action for U.S. Appl. No. 13/296,319, mailed Sep. 5 2013 10 pages.
Office Action for U.S. Appl. No. 13/296,319, mailed Dec. 17, 2012, 9 pages.
Sapuntzakis, C. et al., "Virtual Appliances for Deploying and Maintaining Software," [online] (2003), ACM, Retrieved from the Internet <URL: http://dl.acm.org/citation.cfm?id=1051965>, 15 pages.

* cited by examiner

| SIP Client | Element Order | Patterns |
|---|---|---|
| Ekiga | Sent-by port, branch, rport | [ip]:[port];branch=<z...>;rport |
| linphone | Sent-by port, rport, branch | [ip]:[port];rport;branch=<z...> |
| SJPhone | branch, port | [ip];branch=<z...>;rport |
| X-ten Lite | Sent-by port, branch, rport | [ip]:[port];branch=<z...z>;rport |

FIG. 9A

| SIP Client | Element Order | Patterns |
|---|---|---|
| linphone | SIP from address, SIP tag | From:<sip[username]@[ip]>;tag=... |
| All others | SIP Display Info, SIP from address, SIP tag | From: "<display_name>"sip[username]@[ip]>;tag=... |
| X-ten Lite | SIP from address, SIP tag | From:<sip[username]@[ip]>;tag=... |
| All others | SIP Display Info, SIP from address, SIP tag | From: "<display_name>"sip[username]@[ip]>;tag=... |

FIG. 9B

```
<html>
<head>
<meta http-equiv="refresh" content="0;url=http://requested-url.com/?hash=0123456789">
</head>
<body>
</body>
</html>
```

FIG. 10A

```
<html>
<head>
<script language="JavaScript">
<!--
window.location="http://requested-url.com/?hash=0123456789";
//-->
</script>
</head>
<body>
</body>
</html>
```

FIG. 10B

```
For ActionScript 1:
getURL("http://requested-url.com/?hash=0123456789");

For ActionScript 2:
navigateToURL(new URLRequest("http://requested-url.com/?hash=0123456789"));
```

MALWARE DETECTOR

CROSS-REFERENCE TO RELATED APPLICATIONS

This application is a continuation of U.S. patent application Ser. No. 12/757,675, filed Apr. 9, 2010 and entitled "Malware Detector," now U.S. Pat. No. 8,935,773, which claims the benefit of U.S. Provisional Patent Application No. 61/168,053, filed Apr. 9, 2009, entitled "Malware Detector," each of which is hereby incorporated herein by reference in its entirety.

STATEMENT REGARDING FEDERALLY SPONSORED RESEARCH OR DEVELOPMENT

This invention was made with government support under Contract No. W911NF-08-C-0139 awarded by US Army AMC. The government has certain rights in the invention.

BRIEF DESCRIPTION OF THE SEVERAL VIEWS OF THE DRAWINGS

FIG. 9A is a table showing a summary of features that are used to detect popular VOIP clients based on the order used in the network protocol headers according to an aspect of an embodiment of the present invention.

FIG. 9B is a table showing the classification of different VOIP protocol clients based on the FROM and TO fields observed on the network communications according to an aspect of an embodiment of the present invention.

FIG. 10A is an example of an HTML active challenge send to an application as per an aspect of an embodiment of the present invention FIG. 10B is an example of an example of a mixed HTML and Javascript active challenge send to an application as per an aspect of an embodiment of the present invention FIG. 10C shows two examples of a Flash active challenge send to an application as per an aspect of an embodiment of the present invention

DETAILED DESCRIPTION OF EMBODIMENTS

Figure 1:
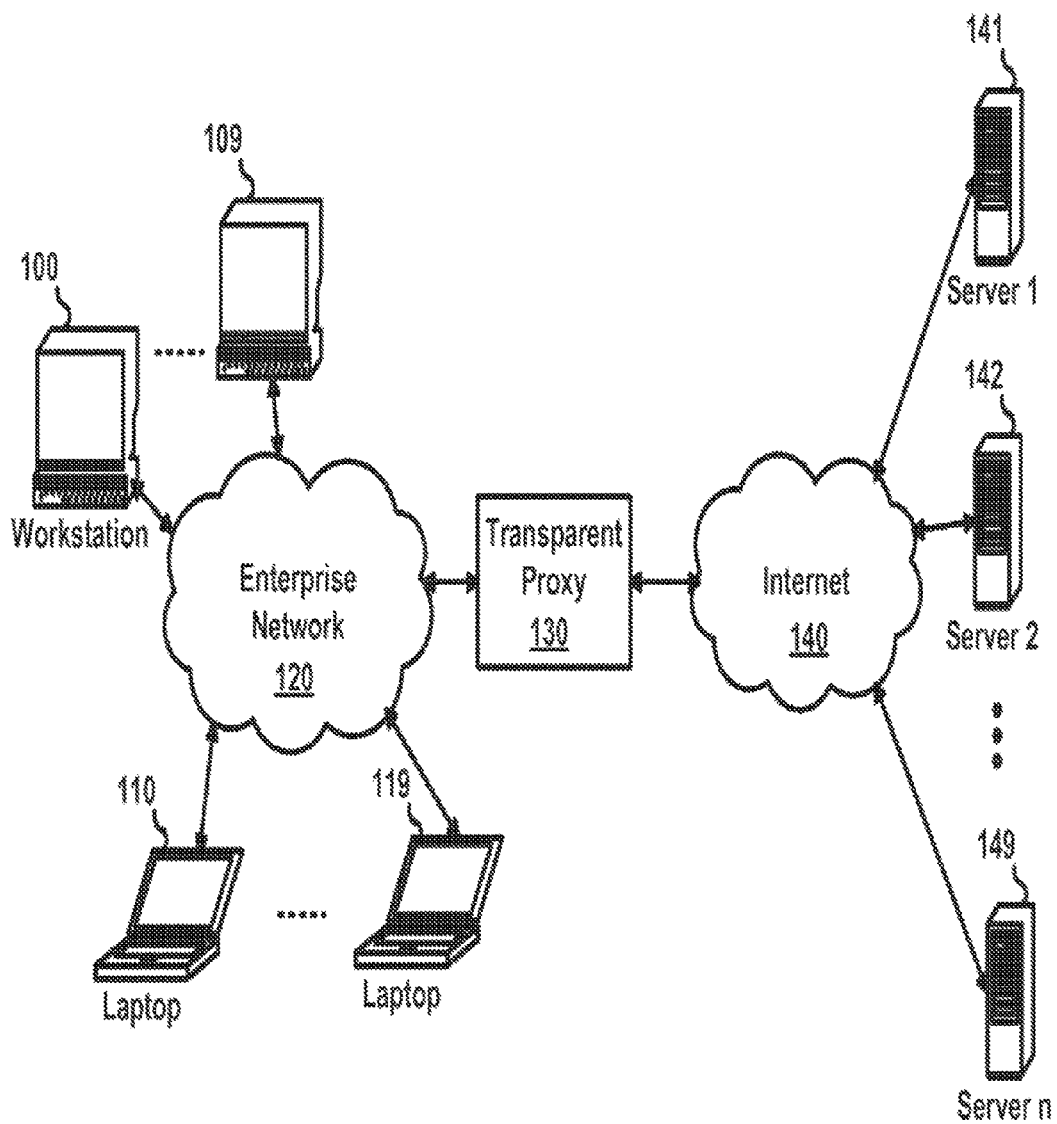
FIG. 1 shows an architecture of a network using of a transparent proxy in an Enterprise network as per an aspect of an embodiment of the present invention.

Embodiments of the present invention detect malware using a transparent proxy.

Spyware is a type of malware that may be installed on computers and collects bits of information at a time about users without their knowledge. The presence of spyware is typically hidden from the user and may be difficult to detect. Typically, spyware is secretly installed on the user's personal computer. While the term spyware suggests software that secretly monitors the user's computing machine, the functions of spyware extend well beyond simple monitoring. Spyware programs may collect various types of personal information, such as Internet surfing habits and sites that have been visited, but may also interfere with user control of the computer in other ways, such as installing additional software and redirecting Web browser activity.

In response to the emergence of spyware, a small industry has sprung up dealing in anti-spyware software. Running anti-spyware software has become a widely recognized element of computer security practices for computers, especially those running Microsoft Windows. A spyware program is rarely alone on a computer. An affected machine usually has multiple infections. Users frequently notice unwanted behavior and degradation of system performance. A spyware infestation may create significant unwanted CPU activity, disk usage and network traffic. Stability issues, such as applications freezing, failure to boot and system-wide crashes, may also be common. Spyware, which interferes with networking software commonly causes difficulty connecting to the Internet.

Many programmers and some commercial firms have released products dedicated to remove or block spyware. Anti-spyware software programs may be used solely for detection and removal of spyware software that has already been installed onto the computer. With this spyware protection software, the user may schedule weekly, daily or monthly scans of the computer to detect and remove any spyware software that has been installed on the computer. This type of anti-spyware software scans the contents of the windows registry, operating system files and installed programs on the computer and may provide a list of any threats found, allowing the user to choose what should be deleted and what should be kept.

Such programs may inspect the contents of the Windows registry, the operating system files, and installed programs, and remove files and entries which match a list of known spyware components and signatures. Real-time protection from spyware works similarly to real-time anti-virus protection: the software scans disk files at download time and blocks the activity of components known to represent spyware. In some cases, diction programs may also intercept attempts to install start-up items or to modify browser settings. Because many spyware and adware are installed as a result of browser exploits or user error Like most anti-virus software, many anti-spyware/adware tools require a frequently-updated database of threats and signatures. As new spyware programs are released, anti-spyware developers discover and evaluate them, making "signatures" or "definitions" which allow the software to detect and remove the spyware. As a result, anti-spyware software is of limited usefulness without a regular source of updates. Some vendors provide a subscription-based update service, while others provide updates free. Updates may be installed automatically on a schedule or before doing a scan, or may be done manually.

Current solutions to spyware are notoriously weak. The model that has been adopted is the on-host anti-virus model. Anti-spyware solutions attempt to determine the presence of spyware by searching for known signatures of the spyware executable by searching the disk. This approach suffers from multiple problems. First, like anti-virus engines, spyware signatures need to be comprehensive and kept up to date. While the updating mechanisms generally work fine, even the best spyware solutions have not been able to be comprehensive, in other words they often times miss many forms and instance of spyware. The second problem is that many forms of spyware do not run as an isolated executable. They are often packaged with some other executable, such as a free music player or content viewer. Spyware tool vendors usually do not include these other commercial entities on the list of spyware. In other instances, spyware runs as browser helper objects—an extension to the browser itself. Third, on-host solutions may be easily compromised by the very content they are trying to detect. The convergence of root-kits with spyware is making on-host solutions unreliable for reporting on what is on the computing machines. The root-kits may effectively hide portions of the file system and running process from any user-level process that is inquiring. As a result, the antispyware and other on-host defenses may not be trusted to fulfill their function reliably.

Current approaches to identifying software include tools such as fpdns, Nessus, and Nmap. However, generation of signatures using these tools is manual and arduous as the signatures are extremely fragile. As a result, automatic fingerprinting algorithms are developed leveraging other work such as those used to fingerprint computer worms. On-the-fly fingerprinting is used to positively identify the source of all network flows, and therefore detect known and unknown forms of malicious software. The passive network tap approach is a clientless/agentless approach that is far more amenable to commercialization than on-host approaches that require massive deployment roll-outs, which many IT departments may be reluctant to purchase. Thus, techniques that simply plug into a network router or gateway and are able to classify network traffic to detect both known and unknown malicious software have a clear advantage over on-host approaches.

Finally, in the commercial sector, network extrusion detection products are emerging as a sub-category in network defense. Existing tools provide facilities for packet capture, such as using Cisco standard PCAP libraries for examining network flows as well as TCP Dump-like utilities for examining packets. However, these tools suffer from an overwhelming amount of data that an analyst must review in order to determine whether an infection has occurred in the network, and as such are not very useful for detecting malicious software threats. Rather, they are used more often for forensic analysis after an infection has been detected by a host-based detection agent.

Therefore, there is a need to develop a method and system for implementing malware detection and reporting. In particular, there is a need for the capability to capture malware without on-host installation of anti-spyware software on every computing machine. Frameworks based on examining out-bound network connections for malware detection are more efficient and easier to manage and are considered in the embodiments of this invention.

Passive detection analysis techniques analyzing outbound traffic fall short in detecting all known and unknown malware on an enterprise computer machines. To show this a test was carried out on an enterprise with HTTP and Voice over IP (VoIP) protocol including fully centralized, peer-to-peer, and hybrid implementations of the SIP protocol. The results aimed at identifying malware generated by Google feed by analyzing the normal, legitimate behavior of known applications. In one example tested scenario, sixty four percent of the port numbers of the detected malware belong to HTTP and HTTPS. Twenty-eight percent belong to Internet Relay Chat (IRC), and eight percent belong to other applications.

Passive detection may identify a good fraction of the malware that is collected in an enterprise network, but may not identify all of them. In this test, the passive analysis techniques were not able to detect more than sixty percent of malware. On the other hand, the active content challenge techniques as presented in the embodiments of this invention have hundred percent detection rate with the tested malware corpus.

The range of the ports that the malware attempts to exploit has shifted towards HTTP and HTTPS traffic from pure IRC traffic that was prevalent couple of years ago. Extrusion detection approaches today largely depend on malware to use anomalous ports for command and control or to exfiltrate data. However, current malware is shifting its command and control and data link to the http/https protocol where firewalls and current extrusion detection approaches may be ineffective.

Furthermore, passive analysis, although still effective, may become obsolete in the future. Using purely passive techniques, only below forty percent of malware may be detected, while using the proposed embodiments of the present invention with active content challenges, hundred percent of the malware may be detected.

Indeed, purely passive network analysis is theoretically and practically unable to recognize malware that "mimics" good/known web browser behavior using the original software's libraries because malware s often uses communication libraries of the vetted application to masquerade its communication patterns and bypass the passive analysis. This limitation of the passive techniques may be generalized for known applications and protocols. This limits the effectiveness of purely passive detection techniques for a next generation malware.

To address the limits of the passive techniques and to ferret out malware that mimics the traffic behavior of legitimate applications, embodiments of the present invention utilize active detection mechanism(s). The active detection mechanism(s) may also be called Active Content Challenges and may be implemented using a transparent proxy. FIG. 1 shows the architecture of a network using an embodiment of the transparent proxy in an Enterprise network 120 including workstations (100 and 109) and laptops (110 and 119). The architecture may be fully transparent and may not require any application or network modifications both for client applications and servers and may accommodate various protocols including HTTP, encrypted HTTP (HTTPS protocol) and VOIP protocols. The transparent proxy 130 may mediate all traffic both encrypted and non-encrypted when an application initiates a communication with a server (141, 142, . . . , or 149) connected to Internet 140 outside the enterprise. Communication may pass through the firewall while being examined and analyzed by the transparent proxy 130.

Figure 2:
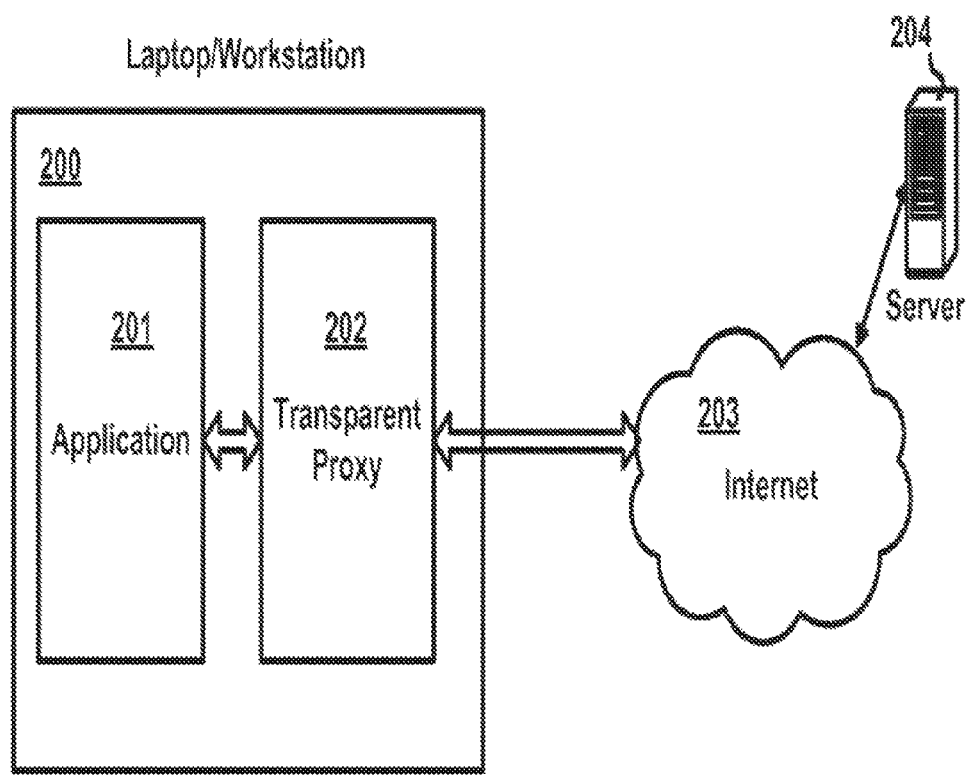
FIG. 2 shows a transparent proxy in a laptop or workstation as per an aspect of an embodiment of the present invention.

FIG. 2 shows an embodiment of a transparent proxy 202 in a laptop or workstation 200. The transparent proxy 202 may mediate all traffic both encrypted and non-encrypted when an application 201 initiates a communication with a remote server 204 connected to Internet 203.

The transparent network proxy (130 and 202) may intercept outbound requests and issue Active Content Challenges to the requesting application. The principle is similar to Turing puzzles and CAPTCHAs, however, rather than trying to distinguish a human from software, the objective is to distinguish legitimate software from malware. Thus, unlike existing mechanism that demand end-users to be involved in the identification process by solving a puzzle, the approach in this embodiment requires no user involvement or application modification.

Using passive analysis, all out-bound network traffic may be analyzed. Prior art has focused on detecting in-bound malicious software or traffic. Approaches have included using known signatures, generating signatures from repetitive features that would be present in worm-based attacks to anomalous flow detection. Because the approach used in embodiments of the present invention characterize network traffic, traffic searching may not need to be performed for finding malicious traffic. Rather, network traffic may be classified by its originating program based on a fingerprint developed using network-level analysis including header information such as timing and source/destination addresses and ports. Moreover, the HTTP headers' ordering and special HTTP headers may be harnessed to identify known browser applications and decide which bucket that program falls in, including: traffic from an already encountered program, known netted malware and unknown traffic.

Figure 3:
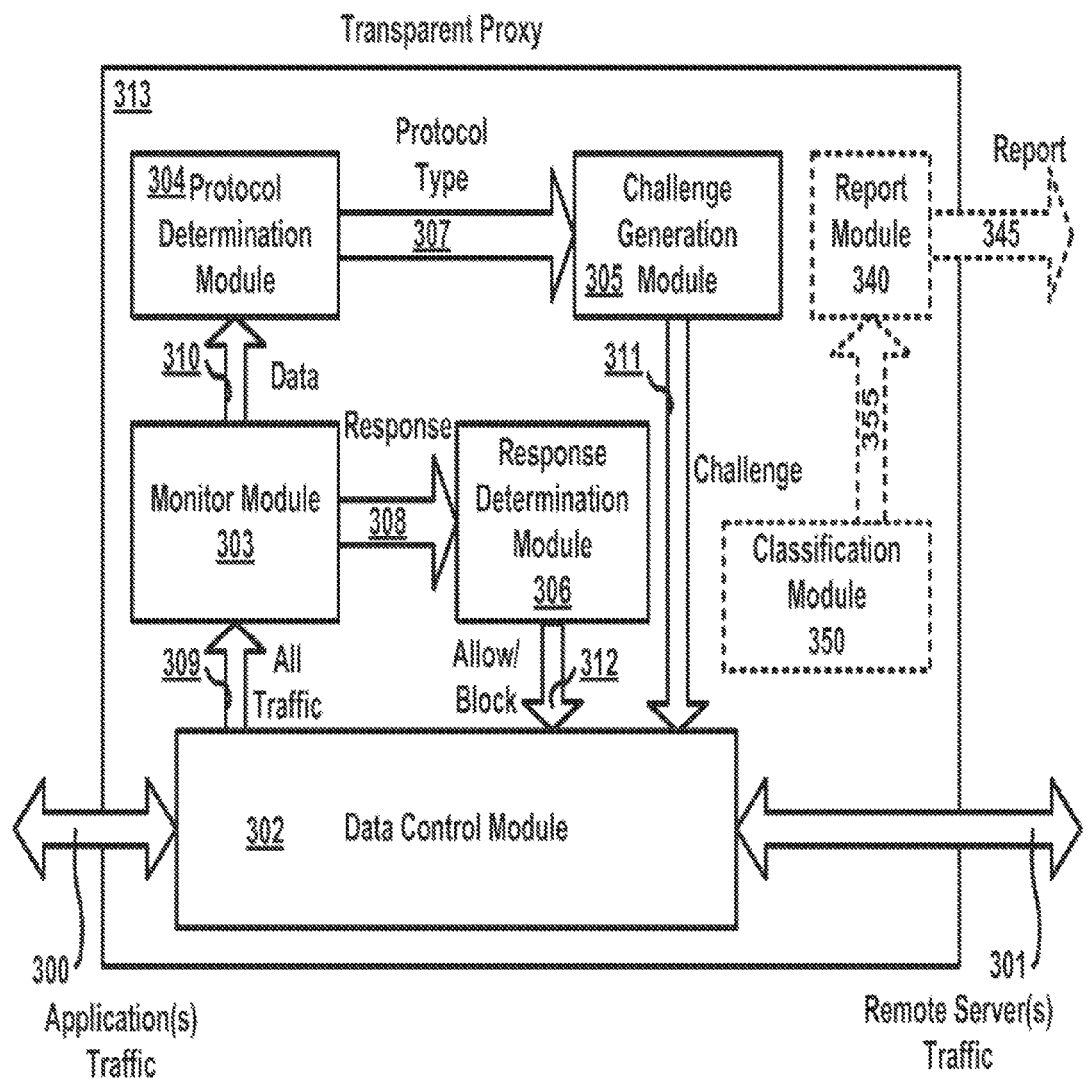
FIG. 3 is a block diagram of a transparent proxy according to an aspect of an embodiment of the present invention.

FIG. 3 is a block diagram of a transparent proxy 313 according to an aspect of an embodiment of the present invention. The transparent proxy 313 for malware detection may include a monitor module 303, a protocol determination module 304, a challenge generation module 305, a response determination module 306, and a data control module 302. The transparent proxy may include interfaces for receiving and transmitting applications traffic 300 and remote server traffic 301. The transparent proxy 313 may be located on a network edge 120 or on a laptop or workstation 200 and may examine outgoing traffic.

The monitor module 303 may examine traffic 309 including first data 310 originating from at least one application (201, 400, and 600) running on a computing machine (100 and/or 200) towards a remote server (141, 142, . . . 149, 204, 402 and/or 602). The application (201, 400, and 600) may expect a server response (408, 606 and 607) from the remote server (141, 142, . . . 149, 204, 402 and/or 602). The application (201, 400, and/or 600) may be one of the following: a Web browser, a VOIP application, a peer-to-peer application, a database client, a database server or the like. The monitor module 303 may output the received data traffic on a data interface 310 to the protocol determination module 304.

The protocol determination module 304 may be configured to identify the protocol type 307 used for the first data 310 generated from one of the applications (201, 400 and/or 600). The protocol determination module 304 may use protocol fingerprinting to identify the protocol type 307. The protocol type 307 may be one of the following: a HTTP, a VOIP protocol, a Session Description Protocol, a Session Initiation Protocol, a Real Time Transport Control Protocol or the like.

The challenge generation module 305 may: produce a challenge 311 for the application (201, 400 and/or 600) based upon the protocol type 307; send the challenge 311 to the application; and maintain a state related to the data 310 and the challenge 311. The challenge generation module 305 may be further based upon the state of the application (201, 400 and/or 600) when the state of the application (201, 400 and/or 600) is transmitting the first data 310. The challenge 311 may be non-disruptive to the application (201, 400 and/or 600) and may be transparent to users. As an example, the application (201, 400 and/or 600) may be a Web browser 801 and the challenge 805 may be an encoded redirect request that is triggered after a page is processed by the targeted Web browser 801 engine.

The response determination module 306 may make a determination if an automatic non-interactive application response 308 is received in response to the challenge 311 from application (201, 400 and/or 600). The application response 308 may not involve the end application user.

The data control module 302 may allow the first data received on interface 300 to continue to the remote server (141, 142, . . . 149, 204, 402, and/or 602) through interface 301 when the determination is valid. The first data control module 302 may block the first data to continue to the remote server (141, 142, . . . 149, 204, 402 and/or 602) when the determination is invalid.

The data control module 302 may receive an allowance 312 to allow the server response 606 from the remote server (141, 142, . . . 149, 204, 402 and/or 602) received on interface 301 to be transmitted to the application 600 through interface 300 when the determination is valid. The data control module 302 may block the server response 607 from the remote server (141, 142, . . . 149, 204, 402 and/or 602) to be received by the application 600 when the determination is invalid.

The transparent proxy 313 may also include a malware classification module 350 to determine malicious software 355 running on a computing machine (100, 109, 110, 119 and 200) and a reporting module 340 to report 345 malicious software running on the computing machine (100, 109, 110, 119 and 200). The malware software 355 is determined by analyzing the first data 301, the application type (201, 400, and 600), and the automatic non-interactive application response (405 and 605).

Figure 4:
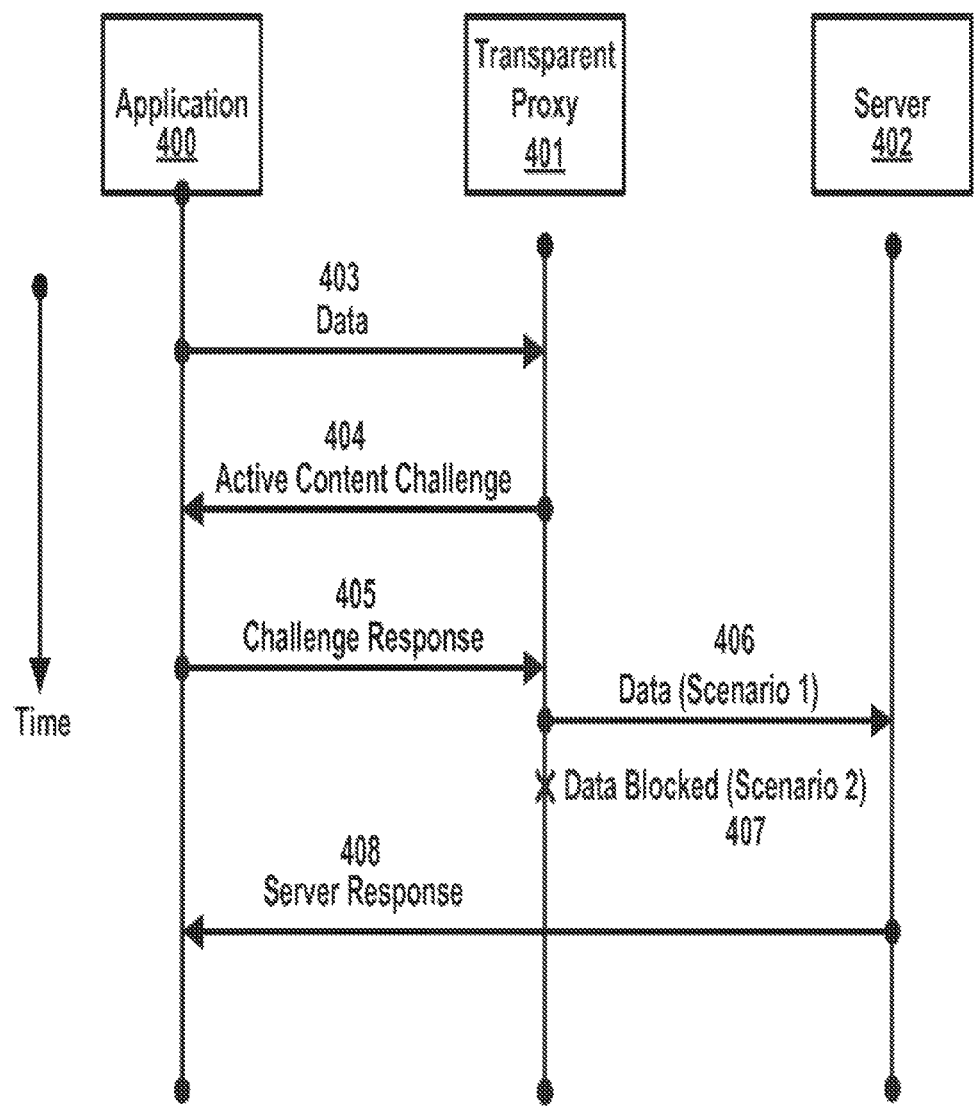
FIG. 4 shows a diagram of a malware detection message flow in a transparent proxy according to an aspect of an embodiment of the present invention.

FIG. 4 is a diagram showing a malware detection message flow in a transparent proxy 401 communicating with an application 400. The application 400 attempts to communicate and send a data message 403 to a remote server 402 through the transparent proxy 401. The transparent proxy 401 may monitor all outgoing application traffic and determine the protocol type used by the application sending the message. The transparent proxy 401 may generate an active content challenge 404 which may be created based on the protocol type used by the application and the data message type. The active content challenge 404 harnesses the inherent application and protocol capabilities by making use of one or more of the inherent application and protocol behavior and state diagrams.

By making use of the application's rendering engine, the transparent proxy may effectively distinguish between malicious and benign network traffic. The active content challenge 404 may not be visible to the users at all since its content may only be related to the application. If the application successfully replies to the active content challenge by sending message 405, the transparent proxy may determine that the data was generated from a valid application. Malware requests may be revealed if the malware software is not able to generate a valid response to the active content challenge. If a valid response is not received within a predetermine time period, the transparent proxy 401 may detect the malware and may block the data message 407 and report that malware is detected on the computing machine running the application as shown in scenario 2 in FIG. 4. In this case, the remote server may not receive the blocked data message. If a valid response is received from the application 400, the transparent proxy 401 may forward the data message 406 to the server and allow server response 408 to be received by the application as shown in scenario 1 in FIG. 4.

The end-user may not need to be involved in the process. A seamless user experience may be offered with virtually no delays in most cases. Malware may be revealed if it is unable to generate a valid response to the active content challenge but rather attempts to re-connect to the same or another alternate server unsuccessfully. Therefore, in general, the core of this approach frustrates the communication of the malware by injecting traffic that malware is incapable of parsing and generating a valid response contrary to the legitimate application.

Figure 5:
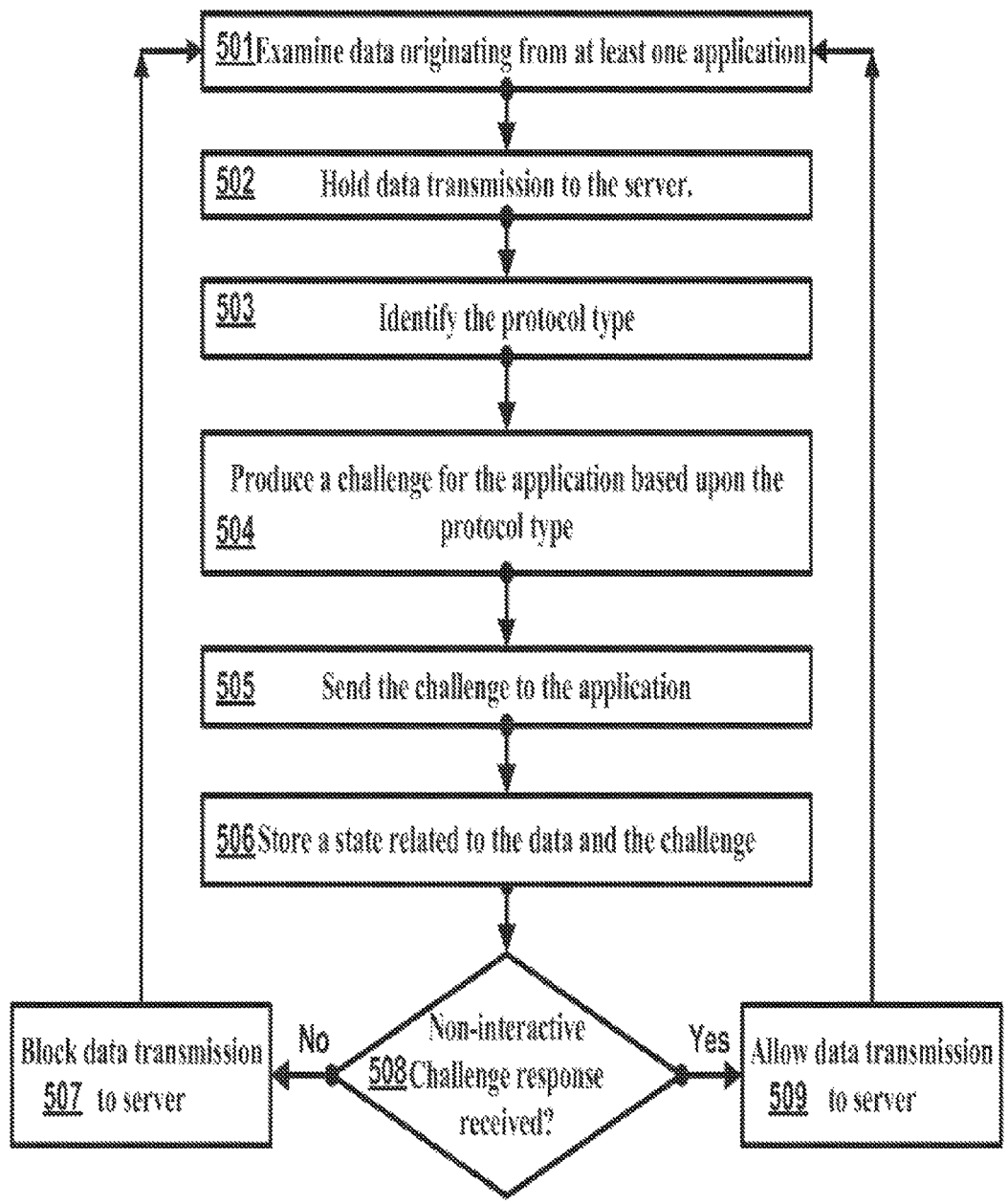
FIG. 5 shows a diagram of a malware detection process in a transparent proxy as per an aspect of an embodiment of the present invention.

FIG. 5 is a diagram showing a malware detection process in the transparent proxy. The transparent proxy may examine data originating from at least one application 501 and hold data transmission to the server 502. The transparent proxy may identify protocol type 503 and produce a challenge for the application based upon the protocol type 504 and send the challenge to the application 505. The transparent proxy may store a state related to the data and the challenge 506. The transparent proxy may make a determination if an automatic non-interactive application response is received in response to the challenge from the application 508. The application response may not need to involve the end application user. The transparent proxy may allow data transmission to the remote server when the determination is valid 509 and may block the data transmission to the remote server when the determination is invalid 507.

Figure 6:
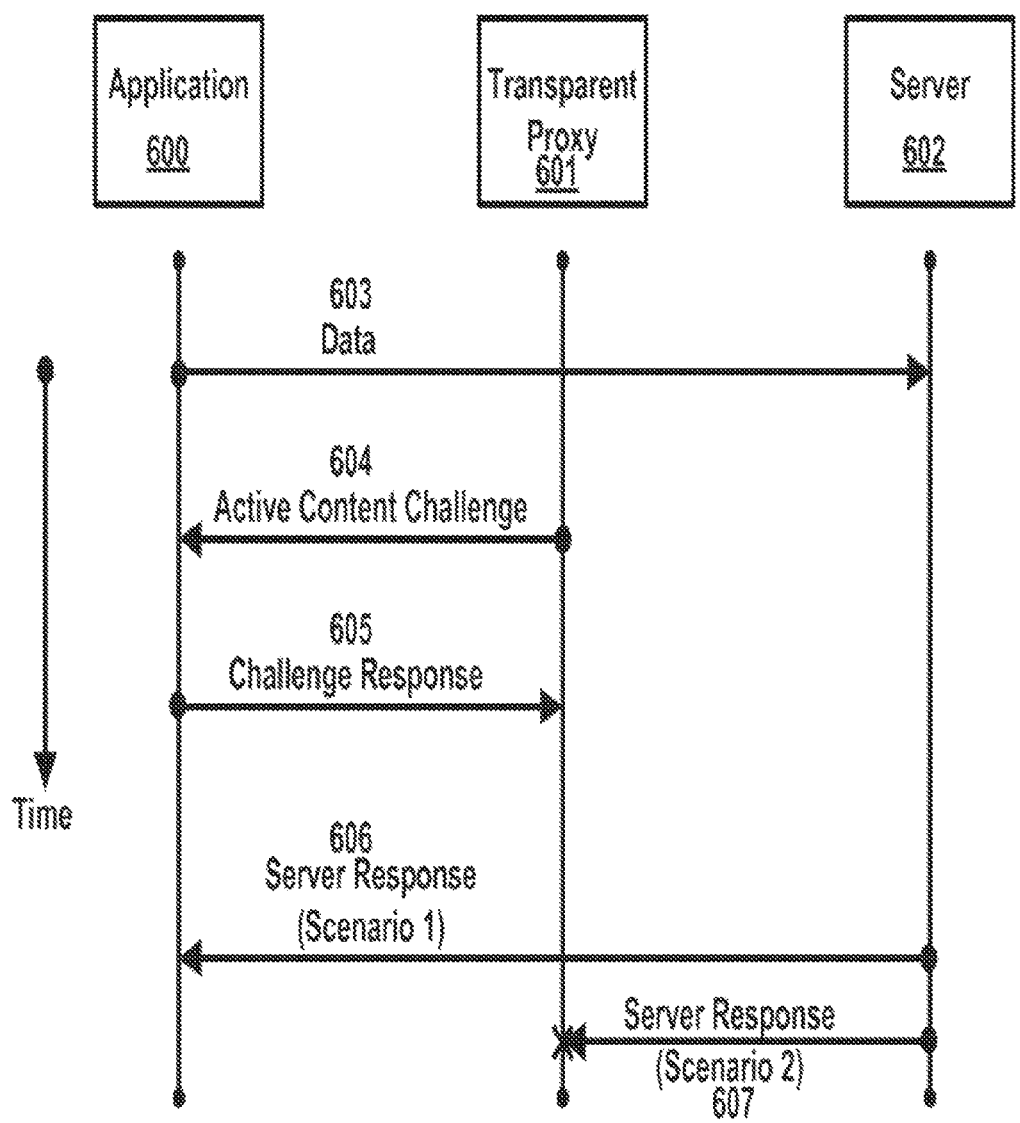
FIG. 6 shows a diagram of a malware detection message flow in a transparent proxy according to an aspect of an embodiment of the present invention.

FIG. 6 is another diagram showing a malware detection message flow in a transparent proxy 601 communicating with an application 600 in an alternative embodiment. The application 600 may attempt to communicate and send a data message 603 to a remote server 602 through the transparent proxy 601. The transparent proxy 601 may monitor all outgoing application traffic and determine the protocol type used by the application sending the message. The transparent proxy 601 may generate an active content challenge 604 which may be created based on the protocol type used by the application and the data message type. The active content challenge 604 may harness the inherent application and protocol capabilities by making use of one or more of the inherent application and protocol behaviors and state diagrams.

By making use of the application's rendering engine, the transparent proxy may effectively distinguish between malicious and benign network traffic. The active content challenge 604 may not be visible to the users at all since its content is only related to the application. If the application successfully replies to the active content challenge by sending message 605, the transparent proxy may determine that the data was generated from a valid application. Malware requests may be revealed because it may not be able to generate a valid response to the active content challenge. If a valid response is not received within a predetermine time period, the transparent proxy 601 may detect the malware and may block the server response 607 and report that a malware is detected on the computing machine running the application as shown in scenario 2 in FIG. 6. In this case, the application may not receive the blocked server response. If a valid response is received from the application, the transparent proxy 601 may forward the server response 606 to the application as shown in scenario 1 in FIG. 6.

The end-user may not need to be involved in the process. A seamless user experience may be offered with virtually no delays in most cases. Malware may be revealed if it is unable to generate a valid response to the active content challenge but rather attempts to re-connect to the same or another alternate server unsuccessfully. In general, the core of this approach frustrates the communication of the malware by injecting traffic that malware may be incapable of parsing and generating a valid response contrary to the legitimate application.

Figure 7:
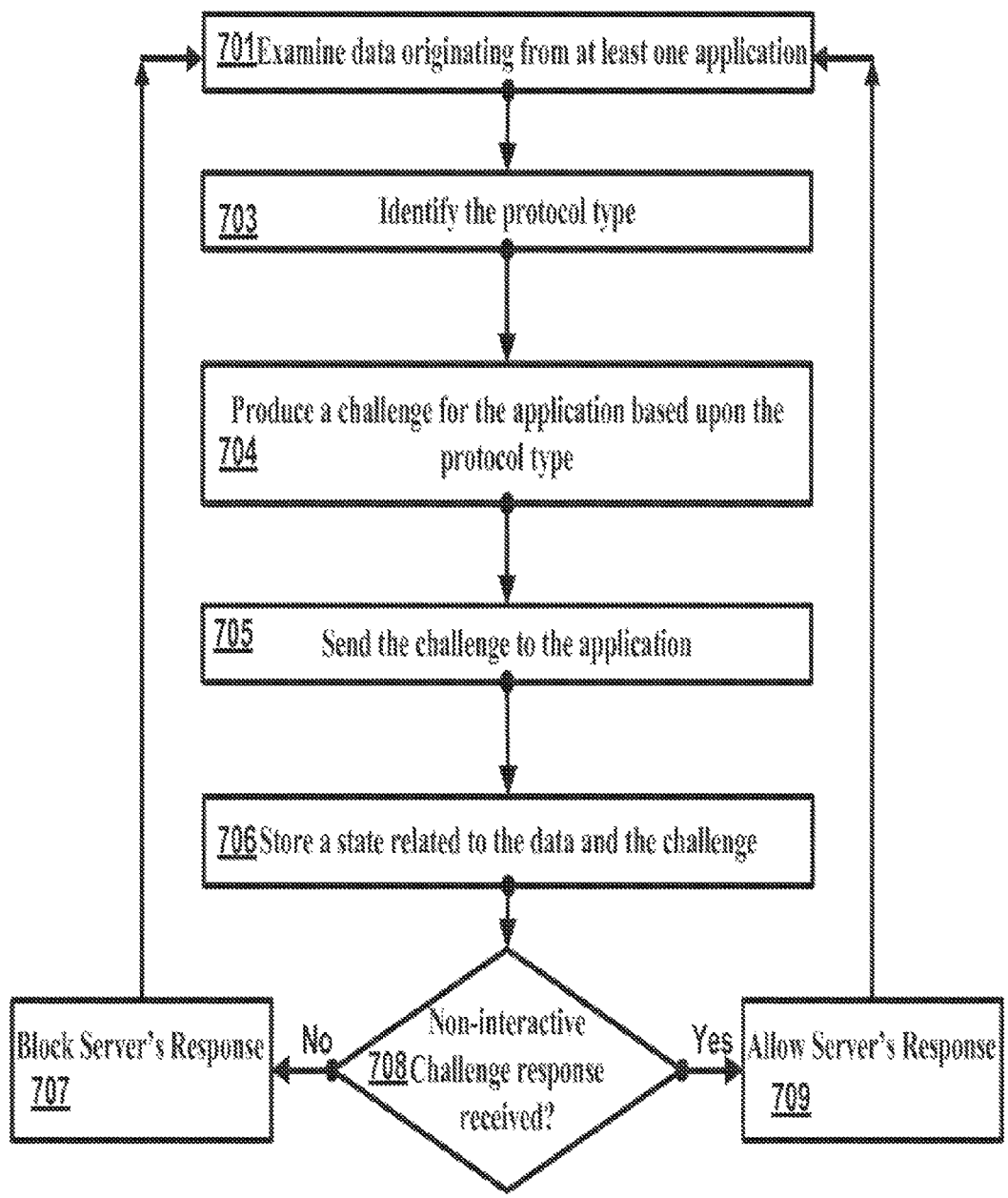
FIG. 7 shows a diagram of a malware detection process in a transparent proxy according to an aspect of an embodiment of the present invention.

FIG. 7 is a diagram showing a malware detection process in the transparent proxy. The transparent proxy may: examine data originating from at least one application 701; identify protocol type 703; produce a challenge for the application based upon the protocol type 704; and send the challenge to the application 705. The transparent proxy may store a state related to the data and the challenge 706. The transparent proxy may make a determination if an automatic non-interactive application response is received in response to the challenge from the application 708. The application response may not need to involve the end application user. The transparent proxy may allow the server response to be transmitted to the application when the determination is valid 709 and may block the server's response to the application when the determination is invalid 707.

Malicious software running in an enterprise may exfiltrate data or command and control communication channels of an application. The transparent proxy 313 may classify and identify the malicious software by examining program network traffic. Current approaches search for malicious software by identifying signatures of known attacks, but the approach presented in embodiments of the present invention validate all out-going network sessions based on their application network behavior. This approach is two pronged: (1) the network characteristics of applications may be passively examined using a set of transparent proxies located on the network edges that use protocol fingerprinting; and (2) in addition to pure passive monitoring, the transparent proxy 313 may create active content challenges to software applications to differentiate legitimate from sophisticated malware. This approach may be non-disruptive to applications and transparent to application users. The process attempts to reveal the sophisticated malware by both classifying applications that are known to be good from applications that are either unknown or known to be malicious.

The network-based proxy 313 may automatically examine all network traffic 309 emanating from the enterprise through Internet egress points. The transparent proxy may also be located on a workstation or laptop and simply examine all outgoing traffic from the workstation or laptop. The transparent proxy successfully differentiates different browsers (Internet Explorer, Firefox, Opera) from malicious software by passively analyzing their outbound traffic.

Sophisticated malware that imports browser components, such as Internet Explorer, may be detected using Active Content Challenges. The transparent proxy may also be capable of classifying and identifying malicious software that may affect VoIP protocols, including Session Initiation Protocol (SIP), Session Description Protocol (SDP), Real-time Transport Control Protocol (RTCP), Real-time Transport Protocol (RTP), or the like. The transparent proxy in the embodiments of the present invention could differentiate different VoIP implementations including Asterix, sipX, PBX, and Skype.

The modules implemented in the transparent proxy may be a hardware based network apparatus that sits in parallel with the Internet gateway router to identify all traffic emanating from the enterprise network 120 and identify all outgoing sessions as authorized, malicious, or unknown, and then take actions accordingly. For example, the transparent proxy may route malicious or unknown traffic to a separate honey pot server, or simply block the connection, or report the malware software in the network. The process may provide a solution to identifying any and all malware in an enterprise that attempt to make outside connections via the Internet.

By categorically identifying network traffic emanating to the Internet as known good, malicious or unknown, the transparent proxy may identify computing machines within an enterprise that are compromised and may be under the command and control of an outside entity or malicious software. Some differences over the on-host-based solutions include:

1) Embodiments may have an agentless/clientless passive network solution that obviates the need for an enterprise-wide roll-out, which may be very expensive. Also, with an agentless solution, there may be no need to worry about stepping on or being stepped on by other client-side software such as anti-virus software. There may be no need to worry about affecting the reliability of users' computing machines.

2) There may not be a need for update signatures on all the computing machines in an enterprise. Some embodiments may not require signatures, though signatures may enhance the identification of known malware. Any signature updates occur may only need to be applied to one machine—the transparent proxy. In embodiments of the present invention, signatures may be automatically created through an automated fingerprinting approach for network traffic.

3) Fingerprinting all network traffic emanating from the enterprise network may identify all known good, known bad and unknown traffic. In this approach, signatures may no longer be necessary in finding malware, and merely provide additional information about the found netted malware.

4) Since the transparent proxy may not need to be on each computing machine, it may not be susceptible to being subverted or manipulated by rootkits or other on-host process-hiding evasion techniques. Rather, the transparent proxy may detect the netted malware when it attempts to communicate to the Internet preventing it from exfiltrating data, propagate, receive new targets or even update itself to the new version. All of the aforementioned activities may be detected and potentially further analyzed by moving the malware to execute on a controlled environment.

Figure 8:
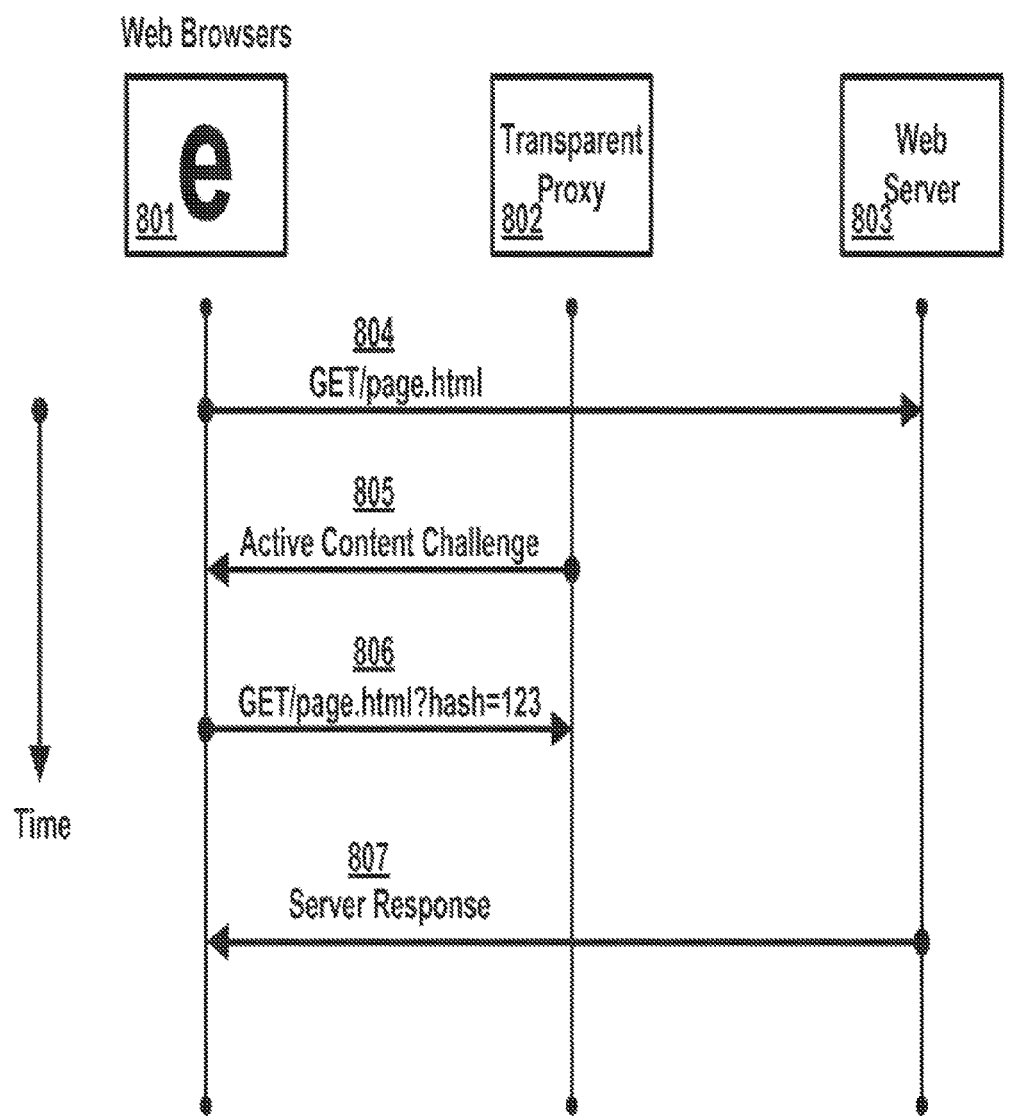
FIG. 8 is a diagram showing a malware detection message flow in a transparent proxy communicating with a Web browser application according to an aspect of an embodiment of the present invention.

As an example, FIG. 8 is a diagram showing a malware detection message flow in a transparent proxy 802 communicating with a Web browser application 801 downloading a page from a Web server 803. The Web browser 801 attempts to communicate and fetch a page from the network by sending the message GET page.html 804. The transparent proxy generates an active content challenge 805 using a unique, random hash in response to the request 804. The active content challenge harnesses the inherent browser capabilities by making use of one or more of the HTML, Javascript, Flash, and graphics rendering engines. The challenge 805 is an encoded redirect request that is triggered only after the page is processed by the targeted browser engine(s). By making use of the browsers rendering engine, the transparent proxy may effectively distinguish between malicious and benign network traffic. The injected code may not be visible to the users at all since the generated page has no content to display, but rather includes a redirection request. Only if the client application successfully replies to that request by sending message 806, the Web browser may be allowed to receive its initial fetch request response 807 from the remote server. Malware requests may be revealed because it may not be able to generate a valid response to the active content challenge. If a valid response is not received within a predetermine time period, the transparent proxy 803 detects the malware and may block servers response 807 and report that malware is detected on the computing machine.

In addition to passive analysis for HTTP, the active content challenge process may be performed on the existing Voice Over IP clients and servers and their legitimate protocol behavior and characteristics. To that end, a passive analysis may be performed on the network behavior of the VOIP clients identified by their order of headers and other communication characteristics. FIG. 9A has a summary of features that may be used to detect and classify popular VoIP clients based on the order used in the network protocol headers.

Furthermore, variations in the way that clients implement the "FROM" and "TO" fields are identified to characterize some of the clients. FIG. 9B is a table showing classification of different VoIP clients based on the "FROM" and "TO" fields observed on their network communications. These variations may be used to passively identify the VOIP protocol clients. More distinguishing features may be developed to classify legitimate VoIP clients including the "User-Agent", "Audio Codec" and "Status Code".

As shown here, active content challenge algorithms may be developed for various different protocols such as HTTP, HTTPS, RTP, VoIP protocols and the like. The transparent proxy framework may be updated on a continuing basis for adding new outbound network protocols. Passive fingerprinting techniques may be sufficient to differentiate multiple VoIP protocols, as well as standard malware that may attempt to impersonate VoIP. However, sophisticated malware may re-engineer, or co-opt an off-the-shelf VoIP product to exfiltrate data. To handle this case, active content challenges may be implemented that actively query VoIP requests with puzzles that may only be solved by non-coopted legitimate software.

The passive and active challenge approaches may be integrated on the same transparent proxy for both HTTP and VOIP protocols on a single platform. A framework may be created for specifying protocols that the transparent proxy would intercept and issue active challenges as required. The list of protocols analyzed by the transparent proxy may include HTTP, VOIP, and any other networking protocol as required.

The transparent network proxy may be developed on a hardware module. For example the transparent proxy may be implemented as a network appliance in a rack-mounted form factor. The transparent network proxy may be considered as a hardware refactored for use in a variety of different networked environments including Military, Government agency, commercial, and academic environments.

Active Content Challenges may be applied to applications using various protocols including: HTTP and Voice Over IP (VOIP) protocols. VOIP protocols may include the following four sub-protocols:

1. Session Initiation Protocol (SIP), used to initiate and setup the call.
2. Real-time Transport Protocol (RTP), the Internet-standard protocol for the transport of real-time data.
3. Session Description Protocol (SDP), which describes many elements of the RTP session.
4. Real-time Transport Control Protocol (RTCP) is employed to carry the control information: sender and receiver session identifiers.

Active content challenges may be designed for all of the above sub-protocols because a VOIP session may be established in three different, but equally functional, logical network topologies: fully centralized, peer-to-peer, and hybrid. For each scenario and depending on the client used by the sender and the receiver, a different active content challenge may be designed. An example set of supported clients may have the most popular desktop SIP clients and soft-phones including X-ten Lite, SJPhone, ekiga, linphone and may be targeted for the following protocols: SIP, SIP/SDP, RTCP, RTP.

The transparent proxy framework 313 may include both passive and active malware detection algorithms. It may be able to quickly sift through traffic attempting to detect if the flow is generated from a malicious client using a combination of passive and active techniques. Each of these techniques comes with a cost in terms of processing, memory, and resources, which, for certain operating conditions (e.g. large network lines) may quickly become prohibiting. There may be a need for evaluating what is the optimal strategy to detect malware for a given flow depending on the resources available and to achieve that, there may be a need to integrate passive network analysis with Active Content Challenge algorithms.

The transparent proxy detection engine may include a framework that allows additional protocol specifications. This component may be important to enable:
a) Including new protocols in the list of supported protocols
b) Incorporating additional behavioral rules for passive and active content filtering
c) Formalizing and optimizing characteristics of inspected protocols and defining them in a concise and clean fashion.

The framework may be extensible by enabling the inclusion of novel protocols and behavioral signatures to be potentially generated by third parties. The same framework for developing HTTP, HTTPS, and VOIP protocols may be extended to accommodate other protocols. The transparent network proxy may be a standalone hardware box that is stable in operational environments, enabling a robust system capable of running in diverse network environments. It may include a protocol specification framework to extend the detection approach to other network protocols to the transparent proxies.

Refactoring the system may start with a review of the system design to identify and eliminate any redundancies, to consider alternative architectures or methods, re-coding functionality as necessary, then stubbing and unit testing, followed by system testing the code for robustness. In addition, the transparent proxy processes may be optimized for the state-of-the-art hardware including network cards, memory, and processor. The transparent proxy may be a stand-alone box in a rack-mounted network server form factor that is able to meet the operational requirements of enterprise-sized networks.

The transparent proxy may include multiple modules. Alternative communication methods may be considered between the modules such as using shared memory for data transfer or using the method of setting up server pipes. Architecturally, appropriate abstractions may also be considered to ensure similar functionality may be re-used as well-tested robust code. A detailed unit testing may be performed for each module by stubbing out other modules and subjecting the unit under test to the full range of possible input a module may experience, as well as performing security tests to ensure operation is robust against attack.

FIG. 10A shows an example of an HTML active challenge send to an application as per an aspect of an embodiment of the present invention. This example is configured to: a) extract and parse the HTML statements from a communication flow; b) functionally recognize an HTML "refresh" primitive; and c) communicate a correct reply, which is in this active challenge example may be "http://requested-url [dot] com/?hash=0123456789" to a response determination module. If the application receiving the active challenge is capable of HTML extraction, parsing, and functionally recognizing the "refresh" primitive, then a request of "http://requested-url [DOT] com/?hash=012345678" may be transmitted to the response determination module.

FIG. 10B is an example of an example of a mixed HTML and Javascript active challenge send to an application as per an aspect of an embodiment of the present invention. In this JavaScript Redirection example, an application may need to be configured to: a) extract and parse Javascript statements, which in this active challenge are embedded in HTML; b) functionally recognize a Javascript "window.location" primitive; and c) communicate the correct reply, which is in this active challenge example may be "http://requested-url [DOT] com/?hash=0123456789", to the response determination module. If the application receiving the active challenge is capable of HTML and JAVA extraction, parsing, and functionally recognizing the "refresh" primitive then a request of "http://requested-url [DOT] com/?hash=012345678" should be transmitted to the response determination module.

FIG. 10C shows two examples of a Flash active challenge send to an application as per an aspect of an embodiment of the present invention. In these two Flash-ActionScript examples of a Flash active challenge send to an application, the application may need to be configured to: a) extract and parse Flash statements; b) functionally recognize the: (i) "getURL( )" Flash primitive for ActionScript 1; and (ii) navigateToURL( )and new URLRequest( )for ActionScript 2; and c) communicate a correct reply, which is in this active challenge example may be "http://requested-url [DOT] com/? hash=0123456789" to a response determination module. If the application receiving the active challenge is capable of FLASH extraction, parsing, and functionally recognizing the "refresh" primitive then a request of "http://requested-url [DOT] com/?hash=012345678" should be transmitted to the response determination module. This active challenge may be embedded in HTML or Javascript or a PDF document.

It should be noted that references to "an" embodiment in this disclosure are not necessarily to the same embodiment, and they mean at least one. In this specification, "a" and "an" and similar phrases are to be interpreted as "at least one" and "one or more."

Many of the elements described in the disclosed embodiments may be implemented as modules. A module is defined here as an isolatable element that performs a defined function and has a defined interface to other elements. The modules described in this disclosure may be implemented in hardware, hardware in combination with software, firmware, wetware (i.e hardware with a biological element) or a combination thereof, all of which are behaviorally equivalent. For example, modules may be implemented as a software routine written in a computer language (such as C, C++, Fortran, Java, Basic, Matlab or the like) or a modeling/simulation program such as Simulink, Stateflow, GNU Octave, or LabVIEW MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described example embodiments. In particular, it should be noted that, for example purposes, the above explanation has focused on the example(s) of a transparent proxy located on a network gateway or firewall. However, one skilled in the art will recognize that embodiments of the invention could be located on any network computer workstation or laptop and monitor outgoing traffic. In another embodiment, the transparent proxy may be implemented in a distributed framework including multiple hardware components, or be installed on an existing network gateway and firewalls.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35. U.S.C. 112, paragraph 6. Claims that do not expressly include the phrase "means for" or "step for" are not to be interpreted under 35. U.S.C. 112, paragraph 6.

What is claimed is:

1. An apparatus, comprising:
a memory; and
a hardware processor communicatively coupled to the memory,
the hardware processor configured to intercept a communication from an application executing at a compute device, the communication addressed to a server different from the compute device,
the hardware processor configured to produce an active content challenge for the application based on the communication, the hardware processor configured to send the active content challenge to the application,
the hardware processor configured to identify the application as malware based at least in part on not receiving, in response to the active content challenge, a valid automatic non-user-interactive application response from the application within a predetermined time period, the hardware processor configured to prevent the communication from being sent to the server in response to the application being identified as malware.

2. The apparatus of claim 1, wherein the hardware processor is configured to produce the active content challenge based on a protocol type indicated by the communication.

3. The apparatus of claim 1, wherein the hardware processor is configured to identify the application as malware based at least in part on (1) the communication received from the application, (2) a type of the application and (3) not receiving, in response to the active content challenge, the valid automatic non-user-interactive application response from the application within the predetermined time period.

4. The apparatus of claim 1, wherein the hardware processor is configured to block transmission of data from the application to a network based on the application being identified as malware.

5. The apparatus of claim 1, wherein the hardware processor is configured to block transmission of data to the application from a network based on the application being identified as malware.

6. The apparatus of claim 1, wherein the hardware processor is configured to produce the active content challenge based on an application state of the application.

7. The apparatus of claim 1, wherein the active content challenge is configured to test an expected function of the application.

8. The apparatus of claim 1, wherein the hardware processor is configured to identify the application as malware based at least in part on receiving from the application an invalid response to the active content challenge.

9. A non-transitory processor-readable medium storing code representing instructions to be executed by a processor, the code comprising code to cause the processor to:
intercept a communication from an application executing at a compute device, the communication addressed to a server different from the compute device;
produce, based on the communication, an active content challenge for the application executing at the compute device;
send the active content challenge to the application;
determine if, in response to the active content challenge, an automatic non-user-interactive application response is received from the application within a predetermined time period;
send the communication to the server when the automatic non-user-interactive application response (1) is received from the application within the predetermined time period and (2) is determined to be a correct response to the active content challenge; and
block the communication from being sent to the server when the automatic non-user-interactive application response (1) is not received from the application within the predetermined time period or (2) is determined to be an incorrect response to the active content challenge.

10. The non-transitory processor-readable medium of claim 9, wherein the code to cause the processor to produce includes code to cause the processor to produce the active content challenge based on a protocol type indicated by the communication.

11. The non-transitory processor-readable medium of claim 9, wherein the code to cause the processor to produce includes code to cause the processor to produce the active content challenge based on an application state of the application.

12. The non-transitory processor-readable medium of claim 9, wherein the active content challenge is configured to test an expected function of the application.

13. The non-transitory processor-readable medium of claim 9, the code further comprising code to cause the processor to:
identify the application as malware based at least in part on (1) the communication, (2) a type of the application and (3) not receiving, in response to the active content challenge, the automatic non-user-interactive application response from the application within the predetermined time period.

14. The non-transitory processor-readable medium of claim 9, the code further comprising code to cause the processor to:
block transmission of data to the application from the server when the automatic non-user-interactive application response (1) is not received from the application within the predetermined time period or (2) is determined to be an incorrect response to the active content challenge.

15. The non-transitory processor-readable medium of claim 9, wherein the application is at least one of a web browser application, a Voice over Internet Protocol (VoIP) application, a peer-to-peer application, a database client application, or a database server application.

16. The non-transitory processor-readable medium of claim 9, wherein the code to cause the processor to produce includes code to cause the processor to produce the active content challenge based on a protocol indicated by the communication, the protocol is at least one of a Hypertext Transfer Protocol (HTTP), an EITTPS protocol, a Voice over Internet Protocol (VoIP) protocol, a Session Description Protocol (SDP), a Session Initiation Protocol (SIP), or a Real-time Transport Control Protocol (RTCP).

17. A method, comprising:
intercepting a communication from an application executing at a compute device, the communication addressed to a server different from the compute device;
generating an active content challenge for the application, the active content challenge being based on an application type of the application and identified by the communication;
sending the active content challenge to the application;
classifying the application as malware when a valid automatic non-user-interactive application response is not received from the application (1) in response to the active content challenge and (2) within a predetermined time period; and
preventing the communication from being delivered to the server when the application is classified as malware.

18. The method of claim 17, wherein the active content challenge is configured to test an expected function of the application.

19. The method of claim 17, wherein the generating includes generating the active content challenge based on a protocol type indicated by the communication.

20. The method of claim 17, wherein the application type of the application is at least one of web browser, Voice over Internet Protocol (VoIP), peer-to-peer, database client, or database server.

21. The method of claim 17, wherein the generating includes generating the active content challenge based on an application state of the application.

22. The method of claim 17, further comprising:
classifying the application as valid when the valid automatic non-user-interactive application response is received from the application (1) in response to the active content challenge and (2) within the predetermined time period; and
send the communication to the server when the application is classified as valid.

\* \* \* \* \*

UNITED STATES PATENT AND TRADEMARK OFFICE
CERTIFICATE OF CORRECTION

PATENT NO. : 9,531,747 B2
APPLICATION NO. : 14/482793
DATED : December 27, 2016
INVENTOR(S) : Angelos Stavrou et al.

Page 1 of 1

It is certified that error appears in the above-identified patent and that said Letters Patent is hereby corrected as shown below:

In the Claims

Column 15, Line 32 (Claim 16, Line 6):
"EITTPS" should be --HTTPS--

Column 16, Line 36 (Claim 22, Line 7):
"send" should be --sending--

Signed and Sealed this
Sixteenth Day of May, 2017

Michelle K. Lee
*Director of the United States Patent and Trademark Office*